United States Patent Office 3,305,925
Patented Feb. 28, 1967

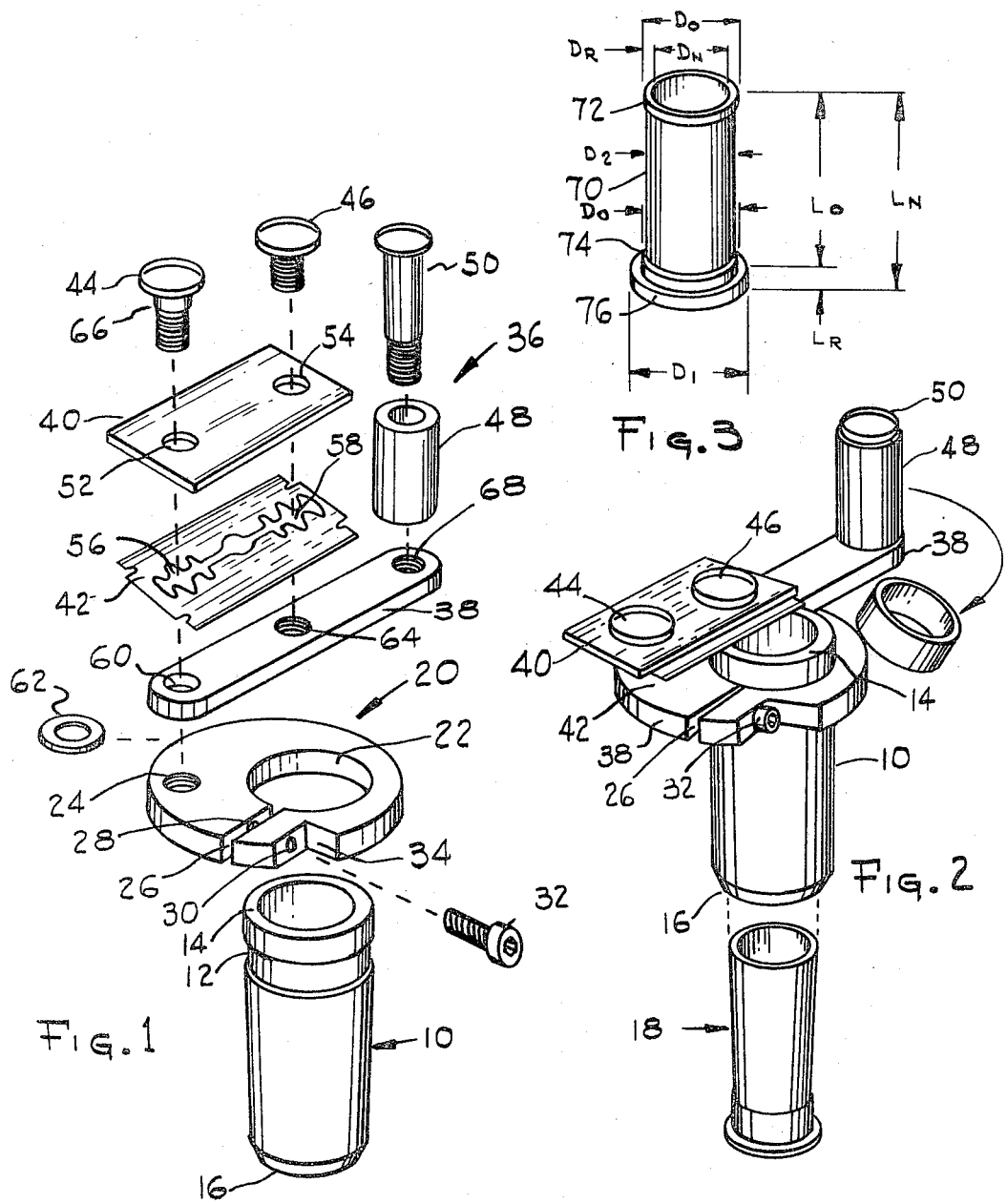

3,305,925
TANGENTIAL TRIMMER
William J. Middleton, Jr., Orlando, Fla.
(1664 N. Taylor Drive, Dover, Del. 19901)
Filed July 6, 1964, Ser. No. 380,235
8 Claims. (Cl. 30—289)

This invention relates to a tangential trimmer, and more particularly to a novel tangential trimmer for trimming the ends of cylindrical members, such as the casings of paper or plastic shotgun shells.

In the art of reloading shotgun shells, it is highly desirable to trim the peripheral edge or lip of the shell casing so that it lies in a plane substantially perpendicular to the axis of the shell. Heretofore, it was common to utilize engine lathes or other special turning machinery for holding the shell, and for turning such shell against a cutting member. This technique, although satisfactory in many respects, is unsatisfactory in that it is bulky and expensive and requires considerable set-up time.

Of course, it is also well known to use knives, saws or other hand cutters for manually trimming shell casings, for example. These tools are unsatisfactory in that it is considerably difficult to manually cut or trim the shell casing in a neat, trim and square manner. Additionally, these latter hand tools are relatively unsafe since it is difficult to guide the manual cutter across the smooth surface of the shell casing, therefore resulting in many instances in the user cutting his hand or finger.

Another well known tool for cutting cylindrical members is the plumber's "pipe cutter," which generically includes a C-shaped head having a cutting wheel at one end of the "C," and roller guides at the other end of the "C." The pipe to be cut is positioned between the cutting wheel and roller guides, and adjusting means are provided for biasing or forcing the roller guides against the pipe. Handle means are also provided for co-axially rotating the pipe cutter about the pipe, thereby causing the cutting wheel to abut the pipe and part or cut it along a predetermined arc. In essence, this type of cutter is a "manual lathe," except that the cutting means moves while the pipe or tube to be cut is held stationary. Although this type of cutter is basically satisfactory, it is not acceptable for trimming the peripheral edges of cylindrical members. That is to say, it is extremely difficult to attach the pipe cutter close to the end of the pipe or tube to be cut. In this respect, it is most common to utilize a mitre saw technique to "square-off" the ends of the cylindrical member. Insofar as the use of a mitre saw for trimming shells is concerned, this technique is undesirable since it leaves a ragged and uneven edge.

The foregoing disadvantages and undesirable aspects of the prior known techniques for cutting cylindrical members are uniquely avoided by the novel tangential trimmer of the present invention.

In accordance with the present invention a cylindrical sleeve of predetermined length and diameter is provided for holding the shotgun shell to be cut in such a manner that a portion of the peripheral edge thereof extends or protrudes a predetermined distance above one end of the sleeve. The sleeve has a circular guide ring rotatably connected to such one end of the sleeve and extending substantially perpendicular to the axis of the sleeve. The guide ring is adapted to rotate about the axis of the sleeve with the axis of rotation of the guide ring being eccentrically positioned with respect to the center of the guide ring. An elongated cross-link member having one of its ends pivotally connected to the guide ring is provided so as to pivot about an axis which is parallel to the axis of the sleeve but spaced from both the axis and the center of the guide ring. The other end of the cross-link has a crank pivotally connected thereto. Positioned between the ends of the cross-link is a clamp adapted to rigidly hold in position a straight edge or cutter, such as a conventional razor blade. The straight edge is oriented so that it faces inwardly toward the axis of the sleeve.

In operation, the shotgun shell is slidably positioned within the sleeve until a desired portion of the shell extends or protrudes above the end of the sleeve about which the guide ring pivots. The cross-link is then pivoted about its axis until the straight edge tangentially abuts the protruding portion of the shell. Finally, the crank is rotated about the axis of the sleeve, thus causing the cross-link, its associated clamp and straight edge, and the guide ring to rotate about the sleeve. It will be apparent here, that as the crank is rotated, the straight edge, which is in a tangentially abutting relationship with respect to the protruding end of the shell to be cut, cuts or parts the shell. After several revolutions of the crank, the protruding portion of the tube or shell is cut flush with regard to the peripheral edge of the sleeve in a clean, even and square cut.

One of the most advantageous features of the tangential trimmer of the present invention is its capability to quickly, smoothly and squarely cut a cylindrical member, and yet requires a considerably less complicated mechanism to do the job. In addition, the present invention is adaptable for cutting cylindrical members of variable length and diameter without necessitating the use of complicated, time-consuming and expensive adapters. Various forms of simple and inexpensive adapters are discussed in detail below.

It is accordingly a primary object of the present invention to provide a novel tangential trimmer.

Another object of the present invention is to provide a novel tangential trimmer which is relatively safe to operate, yet simple in construction, inexpensive, lightweight and rapid in performance.

Another object of the present invention is to provide a novel tangential trimmer which is capable of rapidly cutting the peripheral edge or lip of a cylindrical member, such as a shotgun shell casing, in a neat, trim and square manner.

Another object of the present invention is to provide a tangential trimmer which is uniquely capable of rapidly engaging a cylindrical member to be cut, and advantageously adapted to neatly and cleanly cut such cylindrical member by simply rotating an associated linkage about the axis of the trimmer, thereby cutting or parting a predetermined portion of the cylindrical member in a square manner.

These and further objects and advantages of the present invention will become more apparent upon reference to the following description and claims and the appended drawing wherein:

FIGURE 1 is an exploded view of a tangential trimmer in accordance with the present invention;

FIGURE 2 is an isometric view of a tangential trimmer in accordance with the present invention, with a trimmed shotgun shell casing shown spaced from the bottom of the trimmer, and the trimmed portion of the shotgun shell casing shown spaced from the top of the trimmer;

FIGURE 3 is an isometric view of a preferred embodiment of an adapter for use in combination with the tangential trimmer of the present invention so as to advantageously permit trimming of cylindrical members of variable lengths and diameters.

DETAILED DESCRIPTION—FIGURES 1–2

FIGURES 1 and 2 depict an exploded view and an isometric view, respectively, of a preferred embodiment of the novel tangential trimmer of the present invention.

The tangential trimmer of the present invention comprises a cylindrical sleeve, generally indicated at 10, having a groove 12 formed therein. The upper end 14 and lower end 16 of sleeve 10 are substantially parallel with respect to each other, and the plane of each end is perpendicular to the axis of sleeve 10.

Sleeve 10 is adapted to receive a cylindrical member to be trimmed, such as the empty shotgun shell of FIG. 2, generally indicated at 18. Note here that the selected diameter of sleeve 10 is dependent upon the diameter of shell 18, whereas the selected length of sleeve 10 is dependent upon the desired length of shell 18 after trimming.

Rotatably associated with sleeve 10 is a split guide ring, generally indicated at 20, which ring is substantially circular in shape, and comprises a large opening 22, an internally threaded hole 24, a split portion 26, co-axially positioned internally threaded hole 28 and clearance hole 30, and a screw 32. When the guide ring is opened so that slot 26 is extended its maximum distance, opening 22 has a diameter slightly larger than the outside diameter of sleeve 10 at any place other than the groove 12. However, when guide ring 20 is closed so that slot 26 is also closed or contracted to its minimum distance, opening 22 has a diameter substantially equal to the outside diameter of sleeve 10 at the groove 12. Note that guide ring 20 is preferably cut-away at 34 so as to provide a flat surface upon which the shoulder of screw 32 will rest when it is completely tightened down into the internally threaded hole 28. Further note that the common axis of threaded hole 28 and clearance hole 30 is transverse to the axis of either opening 22 or internally threaded hole 24. This latter feature is preferable so that the width of slot 26 can be controlled for the purpose of releasably connecting guide ring 20 to the sleeve 10.

It will be apparent at this point in the description of the present invention that slot 26, threaded hole 28, clearance hole 30 and screw 32 are included so that guide ring 20 can be releasably connected to sleeve 10. This feature is highly advantageous in that other sleeves having other desirable or necessary internal diameters and other desirable or necessary lengths may be readily used in the operation of the present invention. Accordingly, other type structures capable of rotatable association with sleeve 10 may be readily substituted for the guide ring 20 without departing from the spirit and scope of the present invention.

An elongated linkage assembly, generally indicated at 36, is connected so as to rotate about the axis of the internally threaded opening 24 of guide ring 20. The linkage assembly 36 comprises a cross-link 38, which has a blade clamp 40 and a razor blade 42 connected at one of its ends by screws 44 and 46, while a crank 48 is connected to its other end by a screw 50. Clamp 40 is provided with two spaced clearance holes 52 and 54. Razor 42 is a conventional double edge razor blade having at least two openings 56 and 58 which respectively align with clearance holes 52 and 54 of clamp 40. It is to be understood that other type razor blades or any well known cutter having at least one straight edge may be substituted for the double edge razor 42 without departing from the spirit and scope of the present invention.

Screws 44 and 46 respectively extend through clearance holes 52 and 54 of clamp 40 and through their respective aligned openings 56 and 58 of blade 42. Screw 44 also extends through clearance hole 60 of cross-link 38 and washer 62, and threadably engages the internally threaded hole 34 of guide ring 20; whereas screw 46 threadably engages internally threaded hole 64 of cross-link 38. Note here, that with screws 44 and 46 are tightly screwed down into their respective threaded holes 24 and 64, the clamp 40 firmly holds razor 42 against the cross-link 38, and thereby prevents the straight edge of razor 42 from moving relative to the edge of cross-link 38. Also note, that the washer 62 and shoulder 66 of screw 44 permit cross-link 38 to rotate about the axis of internally threaded hole 24 of guide ring 20.

Crank 48 is rotatably connected to cross-link 38 by the shoulder of screw 50 which is formed at the point where the threads at the bottom portion of screw 50 end. Screw 50 extends through crank 48 and threadably engages the internally threaded hole 68 of cross-link 38, and due to the unthreaded portion of the shank of screw 50, i.e., the shoulder thereof, crank 48 is permitted to rotate about the axis of the screw 50.

The operation of the novel tangential trimmer of the present invention is as follows:

Crank 48 is moved clockwise so as to cause the cross-link 38 to rotate about the axis of the internally threaded hole 24, thus causing the straight edge of the razor 42 to also rotate or pivot clockwise toward the axis of the sleeve 10. Of course, when the shell 18 is positioned within the sleeve 10, blade 42 will move clockwise until the straight edge of blade 10 tangentially abuts the outer surface of shell 18. Then, by further movement of crank 48 in a clockwise direction, the cross-link 38 no longer pivots about the the axis of the internally threaded hole 24, but now rotates with the guide ring 20, which in turn rotates or pivots about the axis of sleeve 10 within the groove 12. Thus, as the guide ring 20 rotates about the axis of the sleeve 10, the straight edge of blade 42 cuts the shell 18 along a circular arc at the tangential points of contact of blade 42 with shell 18.

It is important to note here, that although the blade 42 is graphically represented as a conventional double edge razor blade, any straight edge adapted to be firmly connected to cross-link 38 can be substituted for blade 42. Further note, that cross-link 38 may also be connected so as to be permanently pivotable about the internally threaded hole 24 of guide ring 20, and the blade 42 may be connected to the cross-link 38 independent of the pivoting screw 44. Also note, that if it is not desired to provide means for substituting different size sleeves in the present tangential trimmer, split ring 20 may be connected so as to be permanently rotatable about the sleeve 10.

DETAILED DESCRIPTION—FIGURE 3

Referring now to FIG. 3, there is shown an isometric view of a preferred embodiment of an adapter for use in combination with the tangential trimmer of FIGS. 1 and 2. This adapter advantageously permits trimming of cylindrical members of variable lengths and diameters, yet does not require that the sleeve 10 be removed and a different size sleeve substituted in its place each time a different size cylindrical member is to be trimmed.

The adapter of FIG. 3 comprises a cylindrical body 70, upper and lower peripheral shoulders 72 and 74, respectively, and a peripheral spacer 76. The diameter $D_O$ of the upper and lower shoulders 72 and 74 is slightly smaller than the inside diameter of sleeve 10 so that the adapted may be slidably inserted into the sleeve 10. However, the diameter $D_1$ of the spacer 76 is reasonably larger than the diameter of sleeve 10 so that the adapter may be extended into the sleeve 10 a predetermined distance. The inside diameter $D_N$ of the adapter is selected depending upon the diameter of the desired cylindrical member to be cut. It will be apparent at this point in the description of FIG. 3, that the differential distance $D_R$, which is diameter $D_O$ minus diameter $D_N$, is the reduced or new diameter of the tangential trimmer when such adapter is inserted into the sleeve 10 of the tangential trimmer of FIGS. 1 and 2. Note also, that diameter $D_2$ is the outside diameter of cylindrical body 70, and such diameter $D_2$ is slightly larger than diameter $D_N$ but slightly smaller than diameter $D_O$.

Looking now at the length of the adapter, length $L_O$ is the distance between the top of shoulder 72 and the bottom of shoulder 74, as shown in FIG. 3, and is equal to approximately the length of sleeve 10. Length $L_N$ is the distance between the top of shoulder 72 and the bottom of spacer 76, as shown in FIG. 3, and is equal to approximately the desired length of the trimmed shell after it has been cut. Note here, that the differential length $L_R$, which is length $L_N$ minus length $L_O$, is the extended length desired so as to adapt the sleeve for use with a shell having a length $L_R$ greater than the length of sleeve 10.

Note at this point, that the adapter of FIG. 3 provides means for reducing the inside diameter of the sleeve of the tangential trimmer of the present invention as well as means for increasing the length of the sleeve of such tangential trimmer. Note also, that in the use of adapters of the type above described, that sleeve 10 will be designed to have the maximum desired diameter and the minimum desired length.

The terms and expressions which have been employed herein are used as terms of description and not of limitation and it is not intended, in the use of such terms and expressions, to exclude any equivalents of the features shown and described, or portions thereof, but it is recognized that various modifications are possible within the scope of the present invention.

Without further elaboration, the foregoing is considered to explain the character of the present invention so that others may, by applying current knowledge, readily adapt the same for use under varying conditions of service while still retaining certain features which may properly be said to constitute the essential items of novelty involved, which items are intended to be defined and secured by the appended claims.

I claim:

1. A tangential trimmer for trimming the open end of a shotgun shell comprising, in combination:
 (a) a cylindrical sleeve having a predetermined length and diameter for holding said shell to be trimmed in such a position that a portion of said shell protrudes a predetermined distance beyond one of the ends of said sleeve;
 (b) a circular guide ring connected to said one end of said sleeve and extending substantially perpendicular to the axis of said sleeve, said guide ring being adapted to rotate about the axis of said sleeve, with the axis of said guide ring being eccentrically positioned with respect to the center of said guide ring;
 (c) an elongated cross-link having one of its ends pivotally connected to said guide ring, said cross-link being adapted to pivot about an axis which is parallel to the axis of said sleeve but spaced from both the axis and the center of said guide ring;
 (d) a rectangular razor blade having at least one straight edge;
 (e) a clamp member connected to said cross-link for rigidly holding said blade between the ends of said cross-link so that said straight edge faces inwardly toward the axis of said sleeve; and
 (f) a crank pivotally connected to the other end of said cross-link so that when said crank is rotated, said cross-link will pivot until said straight edge tangentially abuts said protruding portion of said shell, whereupon said guide ring rotates thereby causing said straight edge to cut said shell along a circular arc at the tangential points of contact of said straight edge with said shell.

2. A tangential trimmer in accordance with claim 1 and further including:
 (a) a cylindrical adapter slidably insertable within said sleeve for reducing the inside diameter of said sleeve and for increasing the length of said sleeve, thereby adapting said trimmer so that it can trim a shell having a smaller diameter and longer length than said predetermined diameter and length.

3. A tangential trimmer in accordance with claim 1 wherein:
 (a) said guide ring is releasably connected to said sleeve so as to provide means for interchanging variable size sleeves, whereby said trimmer can be rapidly adapted to trim shells having various size diameters and lengths.

4. A tangential trimmer for trimming the ends of a member comprising, in combination:
 (a) sleeve means having a predetermined length and inside dimension for holding said member in such a manner that a portion thereof protrudes a slight distance beyond one of the ends of said sleeve means;
 (b) guide means connected to said one end of said sleeve means and being rotatable about the axis of said sleeve means;
 (c) linkage means having one end connected to said guide means and being pivotable about an axis spaced from the axis of said sleeve means;
 (d) cutting means having at least one straight edge;
 (e) clamp means connected to said linkage means for firmly holding said cutting means upon said linkage means so that said straight edge faces toward the axis of said sleeve means; and
 (f) crank means connected to the other end of said linkage means so that when said crank means are rotated said linkage means pivots about said axis spaced from the axis of said sleeve means until said straight edge tangentially abuts said protruding portion of said member, whereupon said linkage means and guide means rotate about the axis of said sleeve means thereby causing said straight edge to cut said member at the tangential points of contact of said straight edge with said member.

5. A tangential trimmer in accordance with claim 4 and further including:
 (a) tubular adapter means insertable within said sleeve means for reducing the inside dimension of said sleeve means, thereby adapting said trimmer so that it can trim a tubular member having a smaller inside dimension than said predetermined inside dimension.

6. A tangential trimmer in accordance with claim 4 and further including:
 (a) tubular adapter means insertable within said sleeve means for increasing the length of said sleeve means, thereby adapting said trimmer so that it can trim a tubular member having a longer length than said predetermined length.

7. A tangential trimmer in accordance with claim 4 and further including:
 (a) tubular adapter means insertable within said sleeve means for reducing the inside dimension of said sleeve means and for increasing the length of said sleeve means, thereby adapting said trimmer so that it can trim a tubular member having a smaller inside dimension and longer length than said predetermined inside dimension and length.

8. A tangential trimmer in accordance with claim 4 wherein:
 (a) said guide means are releasably connected to said sleeve means so as to provide means for interchanging variable size sleeve means, whereby said trimmer can be rapidly adapted to trim tubular members having various inside dimensions and lengths.

References Cited by the Examiner

UNITED STATES PATENTS 2,869,413   1/1959   Anderson _____ 30—94 X
3,010,205  11/1961   Pearl _____ 30—95 X

FOREIGN PATENTS 921,760   3/1963   Great Britain.

WILLIAM FELDMAN, *Primary Examiner.*

JAMES L. JONES, JR., *Examiner.*